Nov. 6, 1923.
M. E. MOELLER
MANUFACTURE OF HYDROMETERS
Filed Oct. 29, 1917
1,473,309
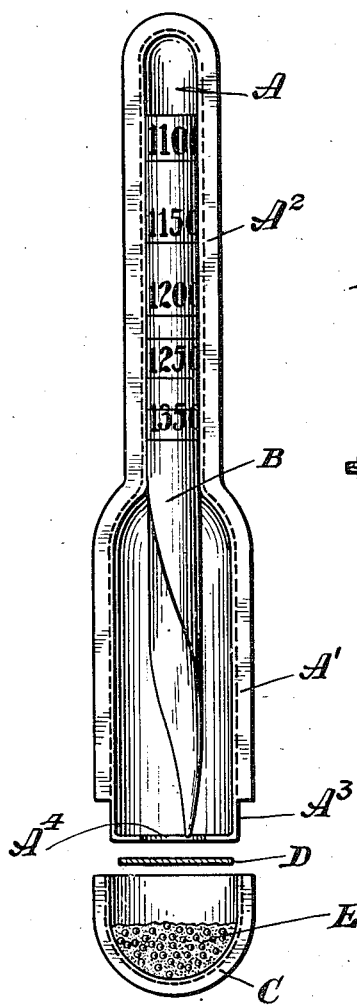
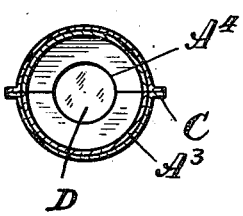
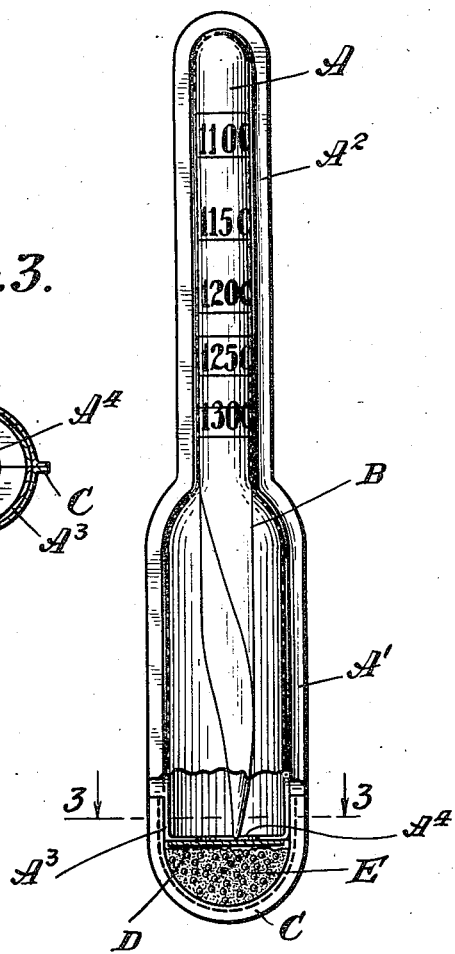
Inventor:
Max E. Moeller
by S. J. Cox Atty Patented Nov. 6, 1923.

1,473,309

UNITED STATES PATENT OFFICE.

MAX E. MOELLER, OF BROOKLYN, NEW YORK.

MANUFACTURE OF HYDROMETERS.

Application filed October 29, 1917. Serial No. 199,015.

*To all whom it may concern:*

Be it known that I, MAX E. MOELLER, a citizen of the United States, and a resident of the borough of Brooklyn, in the county of Kings, city and State of New York, have invented certain new and useful Improvements in the Manufacture of Hydrometers. of which the following is a specification.

The improvements relate to hydrometers and particularly to floating hydrometers, such as are commonly used in syringes used for testing the specific gravity of battery and other fluid, an example of a hydrometer of this character being shown in my Patent No. 1,177,128 of March 28, 1916. The objects are, among others, to provide means for making an accurate floating hydrometer of celluloid or other similar non-breakable transparent composition, and to improve and simplify the method of producing the same, thereby effecting a saving in labor and materials and insuring against an imperfect or inaccurate product. Another object is to produce a hydrometer float of the character described of novel and advantageous construction.

So far as I am informed, prior to my invention no hydrometer float made of transparent non-breakable material was ever produced, and the advantages of such a device, particularly for use in the glass tubular vessel of a syringe, such as that shown in my said patent, will be apparent. These floats are necessarily made of light material and are weighted at the bottom so as to float in an upright position, and when made of glass are frequently broken, thus causing considerable expense and inconvenience, and also putting the user to the trouble of removing the broken parts and replacing the float. It also happens at times that the float becomes cracked and that this injury to it interferes with its operation so as to give inaccurate readings, which if not detected obviously lead to undesirable results.

In the manufacture of hydrometer floats of glass it is possible to place wax which will resist a relatively high temperature and shot in the bottom of the tube, which is closed, and to calibrate it by heating the wax in the bottom and dropping in more shot, or by moving the scale to which access may be had through the open upper end of the tube. When celluloid or other similar substances, which fuse at relatively low temperatures, are used this is not possible, and if a wax which fuses at a lower temperature than the celluloid or other composition is employed it is likely to melt if placed in the sun or near a heated engine, and thus render the instrument permanently inaccurate on account of the disintegration of the weight. Nor can an accurate and satisfactory instrument be produced by placing a metallic plug in the bottom, since the weight of the plug will vary slightly, and the operation of securing it sometimes results in distorting the tube. When celluloid or the like is used it is also inadvisable to weight the float and adjust the scale from the top of the tube, since this necessitates the application of a cap to the top of the tube after the adjustment is completed, and this cap and the adhesive employed to secure it in position will affect the accuracy of the scale. It is to overcome these difficulties and to produce a hydrometer float of the character above indicated, that the present improvements are designed.

The accompanying drawings illustrate the improvements.

In the said drawings, Figure 1 is a side elevation of a hydrometer float, with the weighted cap and sealing disk shown before application to the bottom of the tube, constructed in accordance with the improvements; Figure 2 is a similar view with the said cap and disk in position, some of the bottom parts being broken away and others shown in section; Figure 3 is a horizontal section on the line 3—3 of Figure 2.

In carrying out the improvements the tube A with its enlarged lower portion A' is first formed. This is done preferably by forming the tube in two longitudinal half cylindrical sections and uniting them by means of the flange $A^2$, by means of a heated mold or by pressing them together after applying an adhesive or celluloid solvent to the same. The flange is cut away at the bottom, as shown at $A^3$ so as to leave a small exterior to receive the cap C. The upper scale B, which is cylindrical in form and fits snugly into the tube A, is then inserted and placed in position so that the numbers and markings thereon will correspond with the water line when the float is in a liquid having the specific gravity indicated thereby. The sealing disk D is then applied so as to close the opening $A^4$ in the bottom of the tube A through which the scale has been inserted, and the lower end of the said scale rests against this disk so that it will not move downwardly. In this manner the tube is sealed so that no liquid or other foreign substance can enter, and a means provided for determining at all times that the scale is in its proper position within the tube.

The cap is now weighted, by inserting fine shot and wax E, or by other suitable means, and applied to the bottom of the tube. The float is then placed in a liquid of known specific gravity and the accuracy of the scale observed by comparing the water line with the marking indicating the said known specific gravity. If the float is too light a small quantity of shot may be added to the mass E in the bottom, and if it is too heavy some of it may be removed. This is done by first removing the cap and then correcting the weight by heating the wax and adding or removing shot.

After the cap has been accurately weighted it is then applied to the bottom of the tube permanently, preferably by means of a celluloid solvent applied to the telescoping surfaces which, when it hardens, will form a perfect seal.

It is obvious that modifications of the method herein described, resulting in modifications of the structure produced, may be made without departing from the spirit of the invention. Thus the entire tube including the bottom cap may be formed and the cap then cut off, weighted and reunited with the tube. This last operation may be performed by inserting a cylindrical piece of celluloid in the lower enlarged portion of the tube, permitting its lower edge to project therefrom and passing the upper part of the cap over this projecting portion. The sealing wafer or disk at the bottom of the tube may also be omitted without varying the other features of the invention, particularly if some provision is substituted therefor to keep the low melting wax and shot suspended therein from moving up into the tube in case the instrument is subjected to a temperature higher than the melting point of the wax. The disk or its equivalent, however, are important features, since it is necessary to use a wax which melts at a low temperature and therefore necessary to guard against destruction of the usefulness of the instrument by such temperature.

What I claim is:

1. An article of the character described, comprising a tube of hard elastic transparent material of low fusibility, said tube being composed of sheet material having its longitudinal edges united and forming a cylinder, a removable cap on one end of said tube, and a weighting substance in said cap fusible at a lower temperature than the material of the cap.

2. An article of the character described, comprising a tube of hard transparent material of low fusibility, said tube being composed of sheet material having it longitudinal edges united and forming a cylinder, a removable cap on one end of said tube, a weighting substance in said cap fusible at a lower temperature than the material of the cap, and a partition in the bore of said device adjacent to the weighting substance separating the same from the bore of the tube.

3. An article of the character described, comprising a closed tube of hard elastic transparent material, a fluent weighting substance in one end thereof and an independent partition in the bore of said tube adjacent to said weighting substance and separating it from the interior of the tube.

4. A hydrometer float consisting of a closed tube, composed of an upper and a lower section of hard elastic transparent material, the said sections being joined together and sealed, and the lower section being open at its top and closed at its bottom, a weighting substance enclosed in the lower section and secured to the interior thereof, said weighting substance being of material fusible at temperatures above normal atmospheric and insertible through the open upper end of the lower section before the two sections are sealed.

5. The herein described method of making non-breakable hydrometer floats and weighting and calibrating the same, which consists in forming a tube of hard elastic transparent material, placing a scale in the said tube, fitting a cap to one end thereof and thereby closing the same, placing the tube in a liquid of known specific gravity and noting the relative position of the marking on the scale denoting a specific gravity corresponding with said liquid with reference to the surface of said liquid, then removing the cap and adding more of the weighting substance thereto or removing a part of said weighting substance therefrom if required.

6. The herein described method of making non-breakable hydrometer floats and weighting and calibrating the same, which consists in forming a tube of hard transparent material, placing a scale in the said tube, fitting a cap to one end thereof and thereby closing the same, placing the tube in a liquid of known specific gravity and noting the relative position of the marking on the scale denoting a specific gravity corresponding with said liquid with reference to the surface of said liquid, then removing the cap and adding more of the weighting substance thereto or removing a part of said weighting substance therefrom if required, then replacing the cap and testing the float again in the same manner and repeating the operation until the said marking on the scale coincides with the surface of the liquid and then sealing the cap on the tube.

7. The herein described method of making non-breakable hydrometer floats and weighting and calibrating the same, which consists in forming a tube of hard transparent material, closing one end of said tube, placing a scale in the said tube, fitting a cap to the other end thereof and thereby closing the same, placing the tube in a liquid of known specific gravity and noting the relative position of the marking on the scale denoting a specific gravity corresponding with said liquid with reference to the surface of said liquid, then removing the cap and adding more of the weighting substance thereto or removing a part of said weighting substance therefrom if required.

8. An article of the character described, comprising a tube of hard elastic transparent material of low fusibility, a scale secured within said tube, a removable cap on one end of said tube and a weighting substance in said cap fusible at a lower temperature than the fusing temperature of the tube material.

9. An article of the character described, comprising a tube of hard elastic transparent material of low fusibility, a scale secured within said tube, a removable cap on one end of said tube and a weighting substance in said cap fusible at a lower temperature than the fusing temperature of the tube material, and a diaphragm between the said weighting substance and the interior of the tube separating the same and preventing the weighting substance from flowing into the tube while in a fluent state.

10. The method of making non-breakable hydrometer floats and weighting and calibrating the same which consists in forming a tube of hard, elastic, transparent material with a removable cap, placing therein a scale and an adjustable weight, adjusting the relationship between the position of the scale and the gravity of the weight so that the scale accurately records the specific gravity of the instrument complete, then fixing the cap without adding to the weight of the instrument.

11. The method of making non-breakable hydrometer floats and weighting and calibrating the same which consists in forming a tube of hard, elastic, transparent material with a removable cap, placing therein a scale and an adjustable weight, adjusting the relationship between the position of the scale and the gravity of the weight so that the scale accurately records the specific gravity of the instrument complete, and fixing the said parts in this adjustment, then fixing the cap without adding to the weight of the instrument.

12. The method of making non-breakable hydrometer floats and weighting and calibrating the same which consists in forming a tube of hard, elastic, transparent material with a removable cap, placing therein a scale and an adjustable weight, adjusting the relationship between the position of the scale and the gravity of the weight so that the scale accurately records the specific gravity of the instrument complete, and fixing the said parts in this adjustment, then fixing the cap without adding to the weight of the instrument by heat applied to the exterior thereof.

Witness my hand this 26th day of October, 1917, at the city of New York, in the county and State of New York.

MAX E. MOELLER.